United States Patent [19]

Alexandru et al.

[11] Patent Number: 4,558,108

[45] Date of Patent: Dec. 10, 1985

[54] AQUEOUS SUSPENSION POLYMERIZATION PROCESS

[75] Inventors: Lupu Alexandru, Toronto; Peter G. Odell, Mississauga, both of Canada

[73] Assignee: Xerox Corporation, Stamford, Conn.

[21] Appl. No.: 658,719

[22] Filed: Oct. 9, 1984

Related U.S. Application Data

[63] Continuation-in-part of Ser. No. 453,252, Dec. 27, 1982, abandoned.

[51] Int. Cl.$^4$ ............................................. C08F 2/18
[52] U.S. Cl. ................................ 526/340; 526/340.1
[58] Field of Search ............................. 526/340, 340.1

[56] References Cited

U.S. PATENT DOCUMENTS

| | | |
|---|---|---|
| 2,471,959 | 5/1949 | Hunt . |
| 2,492,763 | 12/1979 | Pinkney . |
| 2,653,145 | 9/1953 | Hohenstein . |
| 2,673,194 | 3/1954 | Grim ................................ 260/93.5 |
| 2,801,992 | 8/1957 | Hutchinson ....................... 260/93.5 |
| 2,836,584 | 5/1958 | Wheelock et al. ................. 260/84.3 |
| 3,285,897 | 11/1966 | Sullivan ............................ 260/91.3 |
| 3,309,297 | 3/1967 | Takatsuki et al. ............. 204/159.23 |
| 3,401,213 | 9/1968 | Trementozzi et al. ............. 260/880 |
| 3,502,582 | 3/1970 | Clemens et al. ................... 252/62.1 |
| 3,687,914 | 8/1972 | Thienot et al. .................... 260/82.1 |
| 4,080,492 | 3/1978 | de Zarauz ......................... 526/177 |
| 4,169,828 | 10/1979 | Wright .............................. 525/264 |
| 4,170,699 | 10/1979 | Wright .............................. 526/215 |

FOREIGN PATENT DOCUMENTS

2082605  3/1982  United Kingdom .

OTHER PUBLICATIONS

"Butadiene Copolymers with Monoethylenically Unsaturated Monomers", Shirato et al., Chemical Abstracts, vol. 71, 1969, p. 64, 82395k.

*Primary Examiner*—Paul R. Michl
*Attorney, Agent, or Firm*—Peter H. Kando

[57] ABSTRACT

A process for forming a copolymer of styrene and butadiene is disclosed including providing an aqueous phase comprising an aqueous mixture comprising water, styrene monomer, butadiene monomer, a suspension stabilizing agent, and a chain propogating amount of one or more free radical polymerization initiators, the ratio of the styrene monomer and the butadiene monomer being between about 80:20 and about 95:5 by weight, the weight proportion of water to the combination of styrene monomer and butadiene monomer being between about 0.8:1 and about 2:1 and a vapor phase comprising an inert gas and butadiene monomer, heating the aqueous phase and the vapor phase to a temperature between about 50° C. and about 130° C. at a pressure between about 20 psi and about 140 psi, removing butadiene monomer from the vapor phase after at least about 75 percent by weight of the butadiene monomer and the styrene monomer in the aqueous phase are converted to a copolymer and prior to conversion of more than about 98 percent by weight of the butadiene monomer and the styrene monomer to a copolymer in the aqueous phase, and heating the aqueous phase at a temperature between about 50° C. and about 130° C. at a pressure between about 20 psi and about 140 psi until at least about 90 percent by weight of the styrene monomer and butadiene monomer are copolymerized to form an aqueous suspension of discrete copolymer particles.

22 Claims, No Drawings

4,558,108

AQUEOUS SUSPENSION POLYMERIZATION PROCESS

This application is a continuation-in-part of copending application U.S. Ser. No. 453,252 filed Dec. 27, 1982, now abandoned, in the names of Lupu Alexandru and Peter G. Odell. Copending application U.S. Ser. No. 453,252 is incorporated herein in its entirety.

BACKGROUND OF THE INVENTION

This invention relates to an aqueous polymerization process for forming a suspension of discrete copolymer particles of styrene and butadiene.

The development of electrostatic latent images with toner particles is well known. The level of sophistication achieved for electrostatic latent image development systems over the years has been most remarkable. For example, slow and laborious manual systems commercialized in the late 1950's have evolved into elegant high speed development systems which spew out as many as two copies per second. Consequently, the performance standards for toners during the evolution of electrostatography have become increasingly stringent. In the early manual development systems, toner and carrier particles were merely moved over an imaging surface bearing an electrostatic latent image by hand, tilting a tray containing the imaging surface and toner and carrier particles. However, in recent years, toner particles are automatically recycled many thousands of times over imaging surfaces moving at extremely high velocities. Thus durable toner materials are required to withstand the physical punishment of vigorous, prolonged and continuous use. Moreover, toner particles deposited in image configuration must now be fused in extremely short periods of time. Due to the size limitations of electrostatic copying and duplicating machines, the fusing path must be relatively short. When one attempts to increase the heat energy applied to deposited toner images for fusing purposes within the constraints of a limited fusing path to achieve adequate fixing at higher rates, one approaches the charing or kindling temperature of the substrate bearing the toner image. Attempts to shorten the fusing path by utilizing flash fusing techniques often result in the formation of noxious fumes due to decomposition of components in some toners. Further, the cost and availability of energy to operate an electrostatographic imaging system is of increasing concern to users. In addition, toner materials must possess the proper triboelectric charging properties for electrostatic latent image development and must not agglomerate during storage and transportation. Thus, there is a great need for an improved toner having stable electrical and physical properties which can endure the harsh environment of high speed electrostatographic copiers and duplicators and which can also be fused at lower energy levels.

Many attempts have been made to formulate polymers which meet the demanding requirements of modern high speed copiers and duplicators. One polymer which is being developed to exhibit properties which can meet the stringent standards of advanced copiers and duplicators is a very specific copolymer of styrene and butadiene having a limited ratio of styrene to butadiene moieties, a well defined minimum glass transition temperature ($T_g$) and a carefully controlled weight average molecular weight ($M_w$) range.

Copolymers of styrene and butadiene may be made by various techniques. Emulsion polymerization is the most popular polymerization process. However, emulsion polymerization processes have a number of drawbacks including complicated and difficult to control coagulation operations necessary to separate the solid polymer from the latex produced during the emulsion polymerization process. Further, such polymerization processes result in undesirable residual contaminants used to carry out the emulsion polymerization. In addition, emulsion polymerization techniques can be relatively expensive due to the complex processing steps required to form and separate the polymers.

Attempts have been made to polymerize copolymers of styrene and butadiene in an aqueous medium to form styrene-butadiene copolymer particles. Examples of these techniques are illustrated in U.S. Pat. Nos. 2,836,584, 4,169,828 and 4,170,699. Unfortunately, these processes have attendant disadvantages when used to make toner resins. For example, the process of U.S. Pat. No. 2,836,584 requires polyvinyl alcohol to prevent the formation of a latex, a redox type polymerization initiator or catalyst, and a long chain mercaptan to control the physical properties of the copolymer. Further, materials containing mercaptans emit hydrogen sulfide into the atmosphere and the sulfurous compounds are absorbed by paper substrates during flash fusing due to the decomposition of the mercaptan. The odor of hydrogen sulfide in xerographic copies renders such consumer products unacceptable. The polymerization processes described in U.S. Pat. Nos. 4,169,828 and 4,170,699 require the presence of a bisulfite or persulfate modifier in the presence of adjunct modifier such as amino acids or glutamic acid which adversely affect the electrical properties of electrostatic toners prepared with these materials.

The polymerization of at least one polymerizable ethylenic monomer suspended in an aqueous medium often requires the presence of other materials such as finely divided inorganic particles and other additives. For example, the process disclosed in U.S. Pat. No. 2,673,194 to Grim requires the presence of an anionic surface active agent and the process disclosed in U.S. Pat. No. 2,801,992 to Hutchinson et al. requires the presence of excess alkali and finely divided magnesium hydroxide.

Accordingly, there continues to be a need for an improved and more effective aqueous polymerization process for forming a suspension of distinct styrene butadiene copolymer particles which may readily be separated from the reaction medium by mere filtration. There also continues to be a need for a polymerization process which will provide toner polymers possessing properties necessary to meet the demanding requirements of modern high speed electrostatographic imaging systems.

SUMMARY OF THE INVENTION

It is an object of this invention to provide an aqueous polymerization process for forming distinct suspended particles of copolymers of styrene and butadiene which overcome the above-noted disadvantages.

It is another object of this invention to provide an aqueous polymerization process for forming copolymers of styrene and butadiene which do not emit mercaptan, hydrogen sulphide or other undsirable compounds during thermal fusing of toner images.

It is another object of this invention to provide an aqueous polymerization process for forming copolymers of styrene and butadiene that minimize electrostatographically undesirable components.

It is another object of this invention to provide an aqueous polymerization process for forming copolymers of styrene and butadiene with short reaction periods.

It is another object of this invention to provide an aqueous polymerization process for forming copolymers of styrene and butadiene with molecular properties which impart improved fixing properties to toners.

It is another object of this invention to provide an aqueous polymerization process for forming copolymers of styrene and butadiene which minimize the amount of residual styrene monomer in the final copolymer product.

It is another object of this invention to provide an aqueous polymerization process for forming copolymers of styrene and butadiene which minimize the amount of residual butadiene monomer in the final copolymer product.

The foregoing objects and others are accomplished in accordance with this invention by providing a process for forming discrete particles of a copolymer of styrene and butadiene in which a vapour phase and an aqueous phase comprising a mixture of water, styrene monomer, butadiene monomer, a suspension stabilizing agent, and a chain-propagating amount of a free radical polymerization initiator insoluble in water, soluble in the styrene monomer, soluble in the butadiene monomer and having a 1 hour half-life between about 50° C. and about 130° C., the ratio of the styrene monomer and the butadiene monomer being between about 80:20 and about 95:5 by weight, the weight proportion of water to the combination of the styrene monomer and the butadiene monomer being between about 1:1 and about 2:1, the suspension stabilizing agent consisting essentially of a finely-divided, difficultly water-soluble powder, is heated in an inert atmosphere to a temperature between about 50° C. and about 130° C. at a pressure between about 20 psi and about 140 psi in the absence of redox initiators and mercaptan compounds, removing butadiene monomer from the vapour phase after at least about 75 percent by weight of the butadiene monomer and styrene monomer in the aqueous phase are converted to a copolymer and prior to conversion of more than about 98 percent by weight of the butadiene monomer and styrene monomer in the aqueous phase to a copolymer, and continuing heating in an inert atmosphere at a temperature between about 50° C. and about 130° C. at a pressure between about 20 psi and about 140 psi until the $T_g$ value of the discrete copolymer particles formed is between about 45° C. and 65° C. and the weight average molecular weight of the discrete copolymer particles is between about 10,000 and about 400,000. Increased molecular weight distribution of the final copolymer may be achieved by introducing an additional mixture of styrene monomer, butadiene monomer, suspension stabilizing agent and initiator to the aqueous mixture at least once during the heating step. The additional initiator is added in a different proportion relative to the new charge of monomer compared to the original aqueous mixture. Optimum yields and minimum residual monomer content are achieved by heating the aqueous mixture with at least two different initiators in accordance with a predetermined multistage heating profile. The different initiators are added in different proportions relative to each other.

Any suitable styrene monomer of polymerizable styrene derivative may be employed in the polymerization process of this invention. Typical polymerizable styrene derivatives include alpha methyl styrene, vinyl toluene, ethyl styrene, monochlorostyrene, dichlorostyrene, alkoxystyrenes such as paramethoxy styrene and the like. Styrene is preferred because of its low cost and availability.

The other monomeric reactant employed in the process of this invention is 1,3-butadiene.

The preferred ratio of the styrene monomer to butadiene monomer reactants is between about 80:20 and about 95:5 by weight. Excessively low ratios of styrene monomer tend to cause a decrease of the Tg which will lead to unacceptably low toner resin blocking temperatures and agglomeration of toner particles obtained from such resins. Unduly high ratios of styrene monomer result in copolymers with high softening temperatures and lead to toners requiring high fixing temperatures and high fixing energy.

Any suitable chain-propagating amount of a free radical polymerization initiator insoluble in water, soluble in the styrene monomer and soluble in the butadiene monomer, may be employed in the process of this invention. Typical monomer soluble free-radical polymerization initiators include lauroyl peroxide, benzoyl peroxide, acetyl peroxide, decanoylperoxide, azo bis isobutyronitrile, t-butylperbenzoate, t-butyl(ethylhexyl)monoperoxycarbonate, peroxydicarbonates, 2,2-azo bis(2,4-dimethyl 1-4-methoxyvaleronitrile), 2,2-azo bis(2,4-dimethylvaleronitrile) and mixtures thereof. Optimum results are achieved with peroxides, peroxycarbonates, peroxybenzoates, azonitrile free-radical polymerization initiators and the like. These free-radical polymerization initiators should possess a half-life of about 1 hour, at temperatures between about 50° C. and about 130° C. in order to effect adequate polymerization at reaction temperatures between about 50° C. and about 130° C. for reaction times of less than about 8 hours. Satisfactory results may be achieved when the reaction mixture comprises from about 0.05 percent to about 6.5 percent by weight of the free radical polymerization initiator based on a total weight of the styrene monomer and butadiene monomer. A range of about 0.1 percent to about 6 percent by weight of the free-radical polymerization initiator is preferred because it provides an acceptable rate of polymerization and leads to the synthesis of copolymers with molecular properties which enable toners containing these copolymers to melt at low temperatures. Too high a concentration leads to too low a molecular weight. Reaction time is excessive when the concentration of initiator is less than about 0.05 percent. Moreover, the suspension becomes unstable and produces polymers having unduly high molecular weight when the initiator concentration is too low. The rate of thermal decomposition of the free-radical polymerization initiator at the reaction temperatures is important in order to lead to an acceptable rate of polymerization and at high conversion to provide sufficient time for diffusion of the free radical species formed to the reactive monomers.

Any suitable suspension stabilizing agent may be utilized in the aqueous reaction mixture of this invention. Preferably, the suspension stabilizing agent is a finely-divided, difficultly water-soluble powder such as tricalcium phosphate, barium phosphate, zinc phosphate, magnesium phosphate, bentonite, talc and the like. The amount of suspension stabilizing agent that may be used ranges from about 0.05 percent to about 6.0 percent by weight, based on total weight of the styrene monomer and butadiene monomer. A range of suspension stabilizing agent of from about 0.05 percent to about 4.0 percent is preferred because it assures a stable suspension of copolymer particles.

An ionic surfactant may be utilized to disperse the suspension stabilizing agent. Excellent results have been achieved with sodium alkyl naphthalene sulfonate (Alkanol XC, available from E. I. duPont deNemours & Co.) which aids suspension stabilizing agents such as tricalcium phosphate to more effectively stabilize the suspension. Other suitable ionic surfactants can be used for this purpose. Typical ionic surfactants include sodium oleate, dodecylbenzene sodium sulphonate, sodium tetradecyl sulphate and the like. The ionic surfactant should be present in an amount between about 0.2 percent and about 4 percent by weight based on the total weight of the suspension stabilizing agent.

The amount of water employed in the polymerization process of this invention may be varied but for reasons of heat transfer and monomer and polymer handling, a water to combined styrene monomer and butadiene monomer weight proportion is preferably between about 0.8:1 and about 2:1. When the amount of water is less than about 0.8:1, it becomes difficult to avoid agglomeration of the suspended copolymer particles under reaction conditions. When more than a 2:1 ratio is utilized, the low yield of copolymer tends to become commercially unattractive.

The reaction should be conducted in an inert atmosphere such as nitrogen, argon and the like. Moreover, the polymerization reaction should be conducted in a closed system to avoid loss of gaseous butadiene and conducted at a pressure of between about 20 psi and about 140 psi, and more preferably between about 40 psi and about 100 psi to drive the monomers into the reactor against back pressure of flashed butadiene. Lower pressures would be insufficient to force the monomers into the reactor and higher pressures would require specially designed and expensive reactors. The pressurized polymerization system comprises a vapour phase containing butadiene monomer and an inert gas and an aqueous phase containing water, styrene monomer, butadiene monomer, a suspension stabilizing agent and one or more chain-propagating free radical polymerization initiators.

Stirring of the reaction mixture during heating is highly desirable in order to avoid agglomeration of the suspended copolymer particles and to disperse the heat of reaction. Any suitable conventional technique may be utilized. Typical agitation systems include mechanical stirring blades, magnetic mixers, ultrasonic agitators, and the like. It is recommended that due to the explosive hazard presented by butadiene, air motors or explosion proof electric motors be utilized for driving mechanical stirrers.

The polymerization temperature will be dependent to some extent upon the half-life of the free-radical polymerization initiator and the weight ratio of water to monomer utilized. Generally, a temperature between about 50° C. and about 130° C. is satisfactory. Temperatures lower than about 50° C. usually require undesirable long reaction times. Temperatures above about 130° C. affect the macromolecular structure and the molecular properties of the product. The double bonds at high reaction temperatures can induce or accelerate undesirable branching, grafting, crosslinking and the like. Reactive free-radical initiators may be employed at temperatures of about 50° C. whereas higher temperatures should be used for less reactive free-radical polymerization initiators. The temperature may be raised to a single preselected level and thereafter maintained for a preselected reaction time. Reaction temperatures of less than about 100° C. reduce further the likelihood of affecting the butadiene configuration in the copolymerization macromolecule and inducing branching and the like. Reaction temperatures above about 100° C. reduce the residual unpolymerized monomers and increases the yield of the reactions.

It has been found that a significant reduction of the residual butadiene monomer in the final reaction product may be achieved by removing substantially all the butadiene monomer still present in the vapour phase after at least about 75 percent by weight of the butadiene monomer and styrene monomer in the aqueous phase are converted to a copolymer and prior to more than about 98 percent by weight of the butadiene monomer and styrene monomer in the aqueous phase are converted to a copolymer thereby allowing the butadiene monomer present in the copolymer particles suspended in the aqueous phase to copolymerize with the styrene coreactant. In suspension polymerization systems the butadiene is partitioned between the polymerizable particles and the vapour phase. It is believed that a dynamic pressure equilibrium controls the partition. As butadiene in the particles copolymerizes with styrene, fresh quantities of butadiene from the vapour phase enter the particles. The pressure in the suspension polymerization system decreases and polymerization conversion is monitored by continuous or periodic recording. Since the pressure in the suspension polymerization system continues to decrease to the end of the polymerization and since butadiene is still found in the final vent, it is believed that fresh butadiene from the vapour phase continues to penetrate into the particles to the end of the polymerization process. Therefore, that part of the butadiene which penetrates the particles only in the final stage of the reaction is not alloted sufficient time to polymerize and remains trapped as a residue in the resin. This appears to be the source of the residual butadiene in the final copolymer resin product. Thus, removal of substantially all the butadiene monomer vapour still present in the vapour phase after the copolymer particles form but prior to termination of the polymerization process allows the butadiene monomer present in the copolymer particles in the aqueous phase to copolymerize with the styrene coreactant.

The butadiene vapour should be removed from the vapour phase after at least about 75 percent by weight of the butadiene monomer and styrene monomer in the aqueous phase are converted to a copolymer and prior to more than about 98 percent by weight of the butadiene monomer and styrene monomer in the aqueous phase are converted to a copolymer to allow the butadiene monomer present in the aqueous phase to copolymerize with the styrene coreactant after removal of the butadiene monomer from the vapour phase and prior to termination of the reaction. Preferably, the butadiene monomer is removed from the vapour phase after at least about 85 percent by weight of the butadiene monomer and styrene monomer in the aqueous phase are converted to a copolymer and prior to more than about 95 percent by weight of the butadiene monomer and styrene monomer in the aqueous phase are converted to a copolymer. During the venting procedure, butadiene monomer removal from the vapour phase should be accomplished as rapidly as possible to limit, as much as possible, loss of butadiene by diffusion out of the polymer particles into the vapour. Though this diffusion is a relatively slow process and thus speed is not particularly critical, except for overall reactor productivity, removal of butadiene should be carried out after the bulk of the polymerization has occurred so as to not waste butadiene or adversely affect the properties of the polymer. Under typical operating conditions, this is about 2.5 to 3 hours into the reaction. This provides sufficient time for the butadiene still dissolved in the polymer to react (e.g., about 45–60 minutes at a high temperature of, for example, about 125° C.). While the butadiene can be removed at any temperature, it is more convenient to do so below the boiling point of water. Thus, for example, the butadiene vapour is typically vented at about 90° C. before raising the reactor temperature to about 125° C.

Removal of the butadiene vapour from the vapour phase may be effected by any suitable technique. For example, the butadiene vapour may be removed by venting, continuous flushing with an inert gas, recycling the reactor vapour space through an appropriate butadiene scrubber, and the like. Venting is preferred because it is simple, rapid, inexpensive and efficient. When venting is employed to removing butadiene monomer from the vapour phase, the venting step should be repeated at least twice to ensure adequate removal of butadiene monomer vapor. The venting procedure involves the following steps: A valve is opened and the pressure in the vapour phase region of the reactor is released at a rate convenient for the reactor and piping size. Following depressurization, the valve is closed and the reactor repressurized with an inert gas. This pressure resulting from repressurization is then released and the process may then be repeated. The butadiene vapour is, in effect, diluted out by repeated purges of inert gas. The reactor pressure need not be reduced to atmospheric pressure so long as the venting process eventually removes substantially all the butadiene monomer vapour from the vapour phase in the reactor. Reduction of the reactor pressure to atmospheric pressure should be avoided when the reactor is at a temperature above 100° C. to avoid excessive loss of water. Preferably, sufficient butadiene monomer vapour is removed from the vapour phase in the reaction system to reduce the butadiene monomer vapour concentration in the vapour phase from about 11 percent by volume to less than about 0.05 percent by volume. This ensures satisfactory achievement of a butadiene monomer concentration in the copolymer particles of less than about 10 parts per million by weight during the polymerization reaction. Preferably, the butadiene monomer concentration in the copolymer particles are reduced to less than about 1 part per million by weight. A low concentration of butadiene monomer in the copolymer particle product is especially desirable to minimize adverse effects on blocking and electrical properties of electrostatographic toners and to obviate health and odour concerns.

It has also been found that significant reduction of the residual styrene monomer in the final reaction product may be achieved by heating the aqueous mixture in accordance with a predetermined heating profile involving heating the aqueous mixture to a first temperature between about 50° C. and less than about 100° C., maintaining the first temperature until substantial thermolitic dissociation of at least one free radical polymerization initiator occurs and thereafter raising the temperature of the aqueous reaction mixture to at least a second temperature greater than about 90° C. and less than about 130° C., but at least 30° C. greater than the first temperature, and maintaining the second temperature for a sufficient period of time to achieve substantial thermolitic dissociation of a second free radical polymerization initiator. By substantial thermolitic dissociation, it is meant that at least about 50 percent based on the initial charge of the free radical polymerization initiator actually dissociates.

Preferably, a free radical polymerization initiator employed in th first heating stage of this multistage heating process should have a one hour half-life temperature between about 50° C. and 100° C. Typical free radical polymerization initiators having one hour half-life temperatures in this range include benzoyl peroxide, (91° C.), lauroyl peroxide, (80° C.), acetyl peroxide, (87° C.), di(n-propyl)peroxydicarbonate, (66° C.), diisopropyl peroxycarbonate, (67° C.), di(sec-butyl)peroxydicarbonate, (67° C.), di(2-ethylhexyl)peroxydicarbonate, (67° C.), di(2-phenoxyethyl)peroxydicarbonate, (67° C.), 2,2'-azo bis(isobutyronitrile), (82° C.), 2,2'-azo bis(2,4-dimethyl-4-methoxyvaleronitrile), (48° C.), 2,2'-azo bis(2,4-dimethylvaleronitrile), (68° C.), 2-t-butylazo-2-cyanopropanol, (97° C.), 2-t-butylazo-2-cyano-4-methoxy-4-methylpetane (87° C.), and the like.

Preferably, a free radical polymerization initiator employed in the second heating stage of this multistage heating process should have a one hour half-life temperature between about 90° C. and 130° C. Typical free radical polymerization initiators which have a half-life temperatures in this range include OO-t-butyl-0-(2-ethylhexyl)monoperoxycarbonate, t-butyl peroxybenzoate, t-butylperoxy 2-ethylhexanoate (92° C.), t-butylperoxy maleic acid (110° C.), 2,5-dimethyl-2,5-di[benzylperoxy]hexane (118° C.), 1-cyano-1-[t-butyl azo]cyclohexane (117° C.), and the like, The initiator for the second heating stage should be substantially inactive at the one hour half-life temperature of the initiator for the first heating stage. This requires a difference of at least about 15° C. between the half-life temperatures of the two initiators. Since some of the initiators listed for the first heating step have a one hour half-life temperature greater than about 15° C. than the one hour half-life temperature of other initiators listed for the first heating stage, these former initiators may be used together with the latter initiators during the first heating step with the former initiators having the higher one hour half-life acting as initiators for the second heating stage. For example, di(n-propyl)-peroxy-dicarbonate may be used with 2-t-butyl azo-2-cyanopropanol.

Satisfactory results may be achieved when about 0.05 percent to about 6.5 percent by weight of initiator based on the total weight of the monomers are utilized in the first heating stage and when about 0.08 percent to about 0.3 percent by weight of the initiator based on the total weight of the initial monomers is utilized in at least the second heating stage. The first (primary) initiator level is chosen so as to achieve the desired molecular weight. The second (finishing) initiator level is chosen to achieve the desired residual monomer level. However, the two initiator levels are not mutually exclusive. The second initiator can affect the molecular weight of the polymers and the primary initiator level can indirectly affect the residual monomer level. The prudent choice of initiator levels and temperature profile controls the final molecular properties.

The reaction time for effecting polymerization of the styrene and butadiene copolymer is also dependent to some extent upon the half-life of the free-radical polymerization initiator and the weight ratio of water to monomer utilized. Moreover, the reaction time also depends upon the weight average molecular weight desired in the final copolymer product. Regardless of whether temperature is raised only to a single preselected level or a single reaction period or to multiple levels for multiple reaction periods, the overall reaction time for the process of this invention is relatively short and is normally less than about 8 hours. However, the reaction time should be sufficiently long to achieve a styrene and butadiene copolymer weight average molecular weight between about 10,000 and about 400,000 for ideal toner resin properties in high speed electrostatographic copiers and duplicators.

Suitable profiles for the multistage heating profile embodiment of this invention may be determined by considering the half life characteristics of the initiators. The lower temperature region must be sufficiently long to polymerize the bulk of the monomer both for energy efficiency and suspension stability. The time for the upper temperature reaction is chosen to be as short as possible while achieving the desired reduction in residual monomer content of the final product and controlling the final Mw. Thus the desired temperature profile may be readily determined by conducting time-temperature reactions and measurement of the polymer properties. Another variable is the length of time spent moving from one temperature to another (the ramp) and this is generally kept as short as possible for the reactor system with a time allowance for the remaining first stage initiator to decompose in a non-explosive fashion.

The multistage heating profile embodiment of this invention has been found to be capable of reducing the residual styrene monomer in the final resin product to as low as about 0.05 percent by weight based on the total weight of the copolymer product and the residual butadiene monomer content to as low as about 17 ppm by weight based on the total weight of the copolymer product. Residual monomer content in the final copolymer product should be minimized to avoid a reduction of the blocking temperature and undesirable environmental effects produced when the resin is subjected to fusing conditions in electrostatographic copiers and duplicators. Generally, for multistage heating profiles, it is desirable that between about 70 percent and about 95 percent by weight of the total monomer mixture be polymerized in the first heating stage to about the molecular weight desired and thereafter heated to one or more subsequent stages to polymerize the residual monomer remaining in the composition. The multistage heating profile permits the use of smaller amounts of active free-radical polymerization initiators in the one or more heating stages following the first heating stage. It is believed that the one or more subsequent heating stages promotes more effective diffusion of the initiator to the monomers for more complete polymerization. The multistage heating profile embodiment also provides optimum molecular weight distribution. Molecular weight distribution (MWD) is defined as the ratio between the weight average molecular weight ($M_w$) and the number average molecular weight ($M_n$).

Further, polymers characterized by broad molecular weight distribution exhibit a larger fusing temperature range which compensates for significantly greater temperature fluctuations thereby permitting a larger operating latitude for electrostatographic fusing systems. For purposes of comparison, the multistage heating profile embodiment can provide copolymers having a molecular weight distribution up to about 9 whereas the simple single stage heating process embodiment provides toner resins having a molecular weight distribution between about 2 and about 5.

This multistage heating profile method for reducing residual butadiene in suspension polymerized styrene-butadiene copolymer resins has been carried out, for example, at polymerization temperatures of 90° C. and 125° C. For example, the butadiene still present in the vapor phase at about the end of the 90° C. polymerization step in the multistage heating polymerization process embodiment was eliminated by venting. More specifically, the reactor was vented at about the final stage of the 90° C. heating profile, e.g. at t=235 minutes after the reactor temperature first reached 90° C. The vent valve was located at on the reactor head. A sample of the vented vapour is preferably examined at this time. The vent valve was then closed and the pressure raised to 15 psi by introducing nitrogen. The reaction was then vented again. This pressurization and release cycle was repeated two more times in the shortest period of time possible. The reactor pressure was then raised to 60 psi and the reaction allowed to proceed according to the above profile. During the high temperature stage, the pressure reached about 80 psi and remained constant until the cooling cycle began. This technique allows most of the butadiene already in the particles to copolymerize during the 125° C. polymerization step and significantly reduces the quantity of butadiene monomer residue in the final copolymer. The residual butadiene monomer content was reduced from about 98 ppm by weight to about 17 ppm by weight. The venting technique of this invention has achieved a reduction of the butadiene monomer residue content in the copolymer resin by one to two orders of magnitude. This method has also been successfully conducted in large batches including reactions in 5 gallon and 100 gallon reactors. Surprisingly, the residual butadiene in the final copolymer was decreased without an accompanying increase in polymerization time and without the necessity of a post-polymerization treatment such as steam stripping.

The venting procedure may vary from reactor to reactor due to relative differences in the volume occupied by the vapour phase. Preferably, the number of vents is sufficient to reduce the butadiene monomer concentration in the vapour phase in the reactor to less than about 0.05 percent concentration by volume. For example, three vents appears sufficient for a 300 ml reactor, but six vents or more may be desirable for a 100 gallon reactor where atmospheric pressure is attained only on the final vents. Prior vents are controlled to maintain the reactor at a pressure higher than atmospheric pressure to control foaming of the aqueous phase. An example of the results of a study of the effectiveness of venting on the vapour phase concentration of butadiene in a 100 gallon reactor is presented below:

| Venting Cycle Number | % (by volume) 1.3-Butadiene in the Vent Gas |
| --- | --- |
| 1 | 11.3 ± 0.6 |
| 2 | 3.2 ± 0.4 |
| 3 | 0.96 ± 0.04 |
| 4 | 0.36 ± 0.01 |
| 5 | 0.12 ± 0.02 |
| 6 | 0.056 ± 0.001 |
| Final at polymerization end | 0.0186 ± 0.0004 |

Improved molecular weight distribution may also be achieved by means of a multiple injection embodiment wherein additional styrene monomer, butadiene monomer, radical initiator and suspension stabilizing agent is introduced into the aqueous mixture at least once during the heating step. If desired, the suspension stabilizing agent may be introduced prior to, simultaneously with or subsequent to the introduction of the other components. Optimum results are achieved when the additional styrene monomer, butadiene monomer and free radical initiator are introduced approximately midway between the initiation and termination of the heating step. The proportions of the additional styrene monomer and butadiene monomer is between about 80:20 and about 95:5 by weight. Toner polymers produced by the multiple injection embodiment have molecular weight distributions between about 2.0 and about 8.0. Generally, the initial charge of styrene monomer and butadiene monomer comprises about 40 to 70 percent by weight of the total charge of styrene monomer and butadiene monomer utilized in the polymerization process. The additional styrene and butadiene monomers are preferably added to the reaction to maximize the molecular weight distribution. The percent by weight of additional initiator based on the weight of additional styrene and butadiene monomers is preferably between about 1.2 and about 2 times the percent by weight of initiator employed for the first charge. In other words, if 3 percent by weight of initiator based on the weight of the monomers in the first charge is employed in the first charge, 3.6 to 6 percent by weight of initiator based on the weight of the monomers in the additional charge should be used for the additional charge. Since the timing of the additional charge depends upon factors such as the proportions of reactants, specific initiator, temperatures and the like, trial runs may be conducted with different addition times to select the addition time that provides the largest molecular weight distribution in the final copolymer product. The additional charge should be sufficiently early to achieve polymerization of at least about 90 percent of the monomers in the second charge. The butadiene vapour should be removed from the vapour phase after polymerization of at least about 75 percent of the monomers in the second charge and prior to conversion of more than about 98 percent by weight of the butadiene monomer and styrene monomer in the aqueous phase to a copolymer, but prior to termination of the polymerization process to allow the butadiene monomer present in the copolymer particles in the aqueous phase to copolymerize with the styrene coreactant.

If desired, the steps of the multistage heating profile embodiment and multiple injection embodiment may be combined. In this case, the second monomer injection and the high temperature initiator can be introduced immediately prior to the second heating stage of the multistage heating profile embodiment. As in the multiple injection embodiment, the butadiene vapour should be removed from the vapour phase after at least about 75 percent by weight of the butadiene monomer and styrene monomer in the aqueous phase are converted to a copolymer and prior to conversion of more than about 98 percent by weight of the butadiene monomer and styrene monomer in the aqueous phase to a copolymer. Heating is continued in the reactor after the butadiene vapour is removed from the vapour phase to allow the butadiene monomer present in the aqueous phase to copolymerize with the styrene coreactant.

In comparing the single stage heating (single injection) embodiment, the multiple injection embodiment and the multiple initiators with a multistage heating profile embodiment, the residual styrene monomer in the final copolymer product can be reduced to as low as about 0.5 percent by weight based on the total weight of the copolymer when utilizing the single injection process, as low as about 1 percent by weight based on the total weight of the copolymer product in the multiple injection embodiment, and as low as about 0.05 percent by weight with the multiple initiators with multistage heating profile embodiment. Thus, the multiple injection embodiment with improved molecular weight distribution is a preferred embodiment and the multiple initiators with multistage heating profile embodiment with its greater molecular weight distribution and significantly lower residual styrene and butadiene monomers is and considered the optimum embodiment.

A combination of the multiple injection with multiple initiators and multistage heating may be preferable in special cases when exceptionally broad MWD and low residual monomer are desired.

The following examples further specifically define the present invention with respect to the copolymer polymerization process and the improved copolymer obtained by means of the process. Percentages are by weight unless otherwise indicated. The examples below are intended to illustrate various control examples and various preferred embodiments of the instant invention.

All of the reactions of the following specific examples except Examples XV and XVI were carried out in a stainless steel Parr 300 ml Pressure Reactor having an interior diameter of 6.3 cm, depth of 9.7 cm and a volume of 300 ml. It was equipped with an internal cooling coil, thermocouple and a four bladed turbine stirrer. The reactor head contained a pressure gage, and inlets for gas and reactants. A condensor was employed to prevent loss of water during an initial flushing of the reactor with nitrogen to remove oxygen prior to the addition of the monomers. Cooling was effected by means of a cooling coil through which cold water was circulated. Heating was effected by means of a heating jacket.

EXAMPLE I

A pressure reactor was charged with about 80 milliliters of de-ionized water, 1.65 grams of tricalcium phosphate, and 0.25 gram of an alkylsodium naphthalene sulfonate (Alkanol XC) available from E. I. duPont de Nemours and Company. The reactor head was then secured to the reactor and the reactor was flushed with purified nitrogen introduced while the reactor was heated to 85° C. with stirring at about 200 rpm. The condensors prevented loss of water carried by the exiting nitrogen. As the reactor was heated, 2.96 grams of benzoyl peroxide and about 54 grams of styrene were mixed together and introduced into a stainless steel cylinder equipped with valves at both ends. About 6.7 grams of 1,3 butadiene was then introduced into the stainless steel cylinder. The condensor on the reactor was thereafter quickly replaced by the cylinder, the pressure reactor was closed to the atmosphere, and the nitrogen flow terminated. The monomers were introduced in a liquid phase under nitrogen pressure of about 80 psi to the stirred aqueous medium. An increase in the reactor pressure was noted and the temperature was raised to about 90° C. The copolymerization reaction was carried out for about 5 hours at a maximum pressure of about 80 psi. The reactor was then cooled to room temperature and vented. The resulting white, uniform polymer beads were washed with 1.0N $HNO_3$, then with water, collected by filtration and dried. The resulting copolymer had a $M_n$ of about 13,000; a $M_w$ of about 49,000, a MWD of about 3.77 and a residual styrene content of less than about 1.49 percent based on the total weight of the copolymer.

EXAMPLE II

The procedure of Example I was repeated using about 120 milliliters of de-ionized water, about 39 milligrams of an organosodium sulfonate (Alkanol XC), about 2.48 grams of tricalcium phosphate, about 54.6 grams of styrene monomer, various amounts of butadiene monomer and various amounts of benzoyl peroxide as listed in Table I below. The temperature of the reaction for various concentrations of the polymerization initiator are also listed in the table below to illustrate the effect of temperature and quantity of initiator on molecular weight distribution.

| Copolymerization Parameters | | Copolymer Properties | | | |
|---|---|---|---|---|---|
| T° | $B_g$ | 1 Wt % | $M_n \times 10^{-3}$ | $M_w \times 10^{-3}$ | $M_w/M_n$ |
| 90 | 9 | 4.2 | 12 | 32 | 2.65 |
| 80 | 9 | 4.2 | 13 | 34 | 2.65 |
| 70 | 9 | 4.2 | 15 | 32 | 2.25 |
| 60 | 9 | 4.2 | 17 | 36 | 2.07 |
| 90 | 9 | 2.1 | 22 | 64 | 2.91 |
| 60 | 12 | 1.74 | 22 | 64 | 2.91 |
| 90 | 12 | 1.74 | 24 | 95 | 4.0 |
| 90 | 9 | 1.05 | 36 | 165 | 4.53 |

The results in the table above indicate that for higher initiator concentrations, the effect of temperature is limited and that at low temperatures the effect of initiator concentration is obscured. Moreover, it demonstrates that an increase of polymerization temperature and a decrease of initiator concentration leads to an increase of the weight average molecular weight ($M_w$) and to the broadening of the molecular weight distribution (MWD). The most dramatic effect is shown when both parameters are modified in the appropriate direction simultaneously.

EXAMPLE III

The procedures of Example I were repeated with about 120 milliliters of de-ionized water, about 2.48 grams of tricalcium phosphate, about 0.039 gram of an organosodium naphthalene sulfonate (Alkanol XC), about 0.33 grams of benzoyl peroxide, about 27 grams of styrene monomer and about 3.6 grams of 1,3-butadiene monomer. The temperature of the reactor was raised to about 90° C. and maintained at that temperature for about 5 hours. However, 1.5 hours after the temperature was raised to 90° C., 1.5 grams of tricalcium phosphate was added using a Catalyst Addition Apparatus supplied by Parr Instrument Co. driven by 60 psi of nitrogen. Then about 27 grams of styrene monomer, about 1.3 grams of benzoyl peroxide in one cylinder and about 3.6 grams of butadiene monomer in another cylinder were introduced into the reactor by nitrogen initially under a pressure of about 75 psi and then increased to 85 psi. After the reaction was allowed to continue for another 3.5 hours, the resulting suspension of copolymer particles was found to be stable and the copolymer particles had a number average molecular weight of 13,319, a weight molecular weight of 46,285, a molecular weight distribution of 3.48 and a yield of about 86 percent. The foregoing reaction was repeated except that the additional styrene monomer, butadiene monomer and polymerization initiator were introduced 2.5 hours after the reaction mixture was heated to about 90° C. After the reaction was allowed to continue for another 2.5 hours, the resulting suspension of copolymer particles was found to be stable and the copolymer had a number average molecular weight of 13,526, a weight average molecular weight of 90.904, a molecular weight distribution of 6.72, and a yield of about 93 percent. The procedure was again repeated except that the additional charge was introduced 3.5 hours after the reaction mixture was heated to about 90° C. After the reaction was allowed to continue for another 1.5 hours, the suspension was lost and the polymer beads agglomerated because less than about 70 percent by weight of the monomers in the additional charge was polymerized. The agglomerated copolymer had a number average molecular weight of 16,161, a weight average molecular weight of 46,034 and a molecular weight distribution of 2.84. The yields were not measures on agglomerated samples. The remaining 1.5 hours was insufficient to polymerize the monomers and this led to suspension failure and the end of the reaction. This example illustrates that 1.5 and 3.5 hours of additional time result in a product having a narrow MWD but that 2.5 hours provide a desired MWD of almost 7. It also demonstrates that the additional charge should be introduced early enough to achieve sufficient polymerization thereby avoiding loss of the suspension.

EXAMPLE IV

The procedure of Example III is repeated with about 120 milliliters of de-ionized water, about 2.48 grams of tricalcium phosphate, and about 39 milligrams of an organosodium naphthalene sulfonate (Alkanol XC). The reactor is flushed with nitrogen and heated to 90° C. About 27 grams of styrene, about 3.6 grams of 1,3-butadiene and about 0.32 grams of benzoyl peroxide were introduced via the valved cylinder with the aid of nitrogen under a pressure of about 40 psi. A slurry mixture of about 27 grams of styrene, about 1.29 grams of benzoyl peroxide and about 1.25 grams of tricalcium phosphate was prepared and introduced into the reactor by means of a valved cylinder along with 3.6 grams of 1,3-butadiene introduced via another valved cylinder at about 2.5 hours into the reaction of the original polymer mixture. The reactor itself was at a pressure of about 35 psi at 2.5 hours into the reaction. The reaction was cooled after about 5 hours and the reaction product washed as described in Example I. The reaction produced a 93 percent yield of polymer having a Mw of about 127,000 and Mn of about 16,500, a MWD of about 7.7, and a residual styrene content of about 0.53 percent by weight based on the total weight of the polymer.

EXAMPLE V

The procedure of Example IV was repeated except that tricalcium phosphate is introduced separately as a powder instead of as a slurry. The tricalcium phosphate is initially stored above the reactor in a small chamber separated from the reactor interior by means of a cap held by an O-ring at the outer end. The pressure of the reactor interior maintains the cap in the chamber. The tricalcium phosphate is added at the same time as the monomeric reactant, 2.5 hours after the reaction was begun, by increasing the pressure in the chamber through a valve to a nitrogen source, thereby causing the cap to pop open and allow the tricalcium phosphate to be forced into the reactor. The reaction product obtained had properties substantially identical to the reaction product obtained in Example V.

EXAMPLE VI

A pressure reactor was charged with about 90 milliliters of deionized water. The reactor head was secured to the reactor. The reactor was heated with stirring to about 35° C. to 40° C. whereupon a slurry of about 2.5 grams of tricalcium phosphate and about 0.039 grams of Alkanol XC in about 30 milliliters of deionized water was added to the reactor. A condensor was attached to the reactor and a nitrogen purge begun while heating was continued to about 90° C. with stirring at about 500 rpm. At about 90° C. the reactor was charged with the aid of pressurized nitrogen with about 1.7 grams benozyl peroxide and about 0.2 milliliters of t-butyl peroxybenzoate in about 54 grams of styrene and about 7.3 grams of butadiene. The reactor was then closed and the temperature was maintained at about 90° C. for about 240 minutes and thereafter raised to about 125° C. The reaction was terminated after a total reaction time of 325 minutes. The resulting copolymer of styrene and butadiene had a weight average molecular weight of about 88,000, a molecular weight distribution of 4.34 and a residual styrene content of about 0.16 percent by weight based on the total weight of the polymer. The yield of copolymer was about 97 percent.

EXAMPLE VII

The process of Example VI was repeated except varying amounts of benzoyl peroxide were used. The results are set forth in the table below:

| Benzoyl Peroxide (g) | Mw | MWD | Residual Styrene (wt %) | Yield |
|---|---|---|---|---|
| 2.1 | 68.000 | 4.08 | 0.13 | 99 |
| 2.5 | 58.000 | 3.95 | 0.12 | >99 |
| 3.4 | 41.000 | 3.67 | 0.08 | >99 |

As indicated in the table, excellent yields were obtained with good molecular weight distribution and low residual styrene.

EXAMPLE VIII

The process of Example VI was repeated except varying amounts of 1,3-butadiene monomer were used. Also, the amount of tricalcium phosphate was increased to 3.00 grams for 13 percent butadiene and to 3.75 grams for 14 and 15 percent butadiene polymerization to preserve the suspension. In other words the suspension will fail without this increase. The results are set forth in the table below:

| Butadiene (hwm) | Mw | MWD | Tg | Residual Styrene (wt %) | Yield |
|---|---|---|---|---|---|
| 10 | 73.000 | 3.64 | 65 |  | 99 |
| 13 | 101.000 | 5.02 | 56 | 0.16 | >99 |
| 14 | 124.000 | 5.78 | 53 | 0.26 | 99 |
| 15 | 151.000 | 7.04 | 47 | 0.31 | 98 |

As indicated in the table, excellent yields were obtained with excellent molecular weight distribution.

EXAMPLE IX

A reactor was prepared as described in Example VI up to the point of monomer addition, whereupon about 1.3 grams of benzoyl peroxide and about 0.2 gram of OO-t-butyl-0-(2-ethylhexyl)monoperoxycarbonate (TBEC) in about 54 grams of styrene and about 7.3 grams of 1,3-butadiene were added with the aid of nitrogen pressure. The reaction vessel was closed and maintained at about 90° C. for about 240 minutes to achieve about 92 percent dissociation of BPO and then raised to about 120° C. for about 60 minutes to achieve about 51 percent dissociation of TBEC. This procedure was repeated twice with fresh reactants except that the last heating step was conducted at about 120° C. for about 120 minutes to achieve about 71 percent dissociation of TBEC for the second mixture, and 180 minutes to achieve about 85 percent dissociation of TBEC for the third mixture. The results of these three runs were as follows:

| Time @ 120° C. (min.) | Mw | MWD | Residual Styrene (wt %) | Yield |
|---|---|---|---|---|
| 60 | 138.000 | 5.37 | 0.20 | 98 |
| 120 | 140.000 | 5.43 | 0.11 | 97 |
| 180 | 181.000 | 7.14 | 0.05 | 99 |

As indicated in the table, excellent yields were obtained with excellent to outstanding molecular weight distribution and low residual sytrene.

EXAMPLE X

A reactor was prepared as described in Example VI up to the point of monomer addition, whereupon varying amounts of benzoyl peroxide and about 0.2 gram of OO-t-butyl-0-(2-ethylhexyl)monoperoxycarbonate (TBEC) in about 54 grams of styrene and about 7.3 grams of 1,3-butadiene were added with the aid of nitrogen pressure. The reaction vessel was closed and maintained at about 90° C. for about 180 minutes to achieve about 82 percent dissociation of BPO and then raised to about 120° C. for about 120 minutes. This reaction was terminated after the expiration of a total time of 325 minutes. The results of these reactions with varying amounts of initiator were as follows:

| Benzoyl Peroxide (hwm) | Mw | MWD | Residual Styrene (wt %) | Yield |
|---|---|---|---|---|
| 2.12 | 179.000 | 7.13 | 0.65 | >99 |
| 2.44 | 148.000 | 6.40 | 0.24 | 99 |
| 2.77 | 117.000 | 5.69 | 0.27 | 98 |

-continued

| Benzoyl Peroxide (hwm) | Mw | MWD | Residual Styrene (wt %) | Yield |
|---|---|---|---|---|
| 3.10 | 90.000 | 4.95 | 0.18 | 98 |

As indicated in the table, excellent yields were obtained with excellent molecular weight distribution.

EXAMPLE XI

The process of Example X was repeated including the temperature profile except that about 1.7 grams of benzoyl peroxide was employed along with varying amounts of TBEC. The results of are set forth below:

| TBEC (hwm) | Mw | MWD | Residual Styrene (wt %) | Yield |
|---|---|---|---|---|
| 0.33 | 105.000 | 5.38 | 0.27 | >99 |
| 0.24 | 99.000 | 5.08 | 0.25 | 98 |
| 0.16 | 91.000 | 4.71 | 0.40 | 99 |

As indicated in the table, excellent yields were obtained with excellent molecular weight distribution for 0.24 TBEC.

EXAMPLE XII

This experiment may be employed to carry out a combination of the multistage heating profile and multiple injection embodiments of this invention. A pressure reactor is charged with about 90 milliliters of deionized water. The reactor head is then secured to the reactor. The reactor is heated with stirring to about 35° C. to 40° C. whereupon a slurry of about 3.0 grams of aluminum orthophosphate and about 0.055 grams of sodium oleate in about 30 milliliters of deionized water is added to the reactor. A condenser is attached to the reactor and a nitrogen purge begun while heating is continued to about 90° C. with stirring at about 500 rpm. At about 90° C. the reactor is charged with the aid of pressurized nitrogen with about 0.43 gram of benzoyl peroxide and about 0.1 milliliter of t-butyl peroxybenzoate in about 27 grams styrene and about 3.6 grams of butadiene. The reactor is maintained at about 90° C. for about 150 minutes when a second addition of about 2.0 grams of aluminum orthophosphate as a slurry in a mixture of about 1.2 grams of benzoyl peroxide and about 0.5 milliliter of t-butyl peroxybenzoate in about 27 grams styrene and about 3.6 grams of butadiene is made. The reactor temperature is maintained at about 90° C. for an additional 60 minutes and thereafter raised to about 125° C. The reaction can be terminated after a total reaction time of about 310 minutes.

EXAMPLE XIII

A stainless steel Parr 300 ml Pressure Reactor having an interior diameter of 6.3 cm, depth of 9.7 cm and a volume of 300 ml was charged with about 100 milliliters of de-ionized water, about 4 grams of tricalcium phosphate, about 0.48 milligram of an organosodium naphthalene sulfonate (Alkanol XC), about 2.24 grams of benzoyl peroxide, about 0.27 milliliter of oo-t-butyl-o-(2-ethylhexyl)monoperoxycarbonate (Lupersol TBEC available from the Lucidol Division of Pennwalt Corp.) about 71.3 grams of styrene monomer and about 10.7 grams of 1.3-butadiene monomer. The reactor was equipped with an internal cooling coil, thermocouple and a four bladed turbine stirrer. The reactor head contained a pressure gage, and inlets and outlets for gas and reactants. A condensor was employed to prevent loss of water during an initial flushing of the reactor with nitrogen to remove oxygen prior to the addition of the monomers. Cooling was effected by means of a cooling coil through which cold water was circulated. Heating was effected by means of a heating jacket. The temperature of the reactor was raised from room temperature to about 90° C. over a period of about 45 minutes and thereafter maintained at 90° C. for about 4 hours. The temperature of the reactor was then raised to about 125° C. over a period of about 40 minutes and thereafter maintained at 125° C. for another hour. The reactor was allowed to cool to room temperature for about 25 minutes. The resulting suspension of copolymer particles was found to be stable and the copolymer particles had a number average molecular weight of 23,000, a weight molecular weight of 145,000, a molecular weight distribution of 6.3 and a yield of about 98 percent. The residual butadiene in the resulting suspension of copolymer particles was about 98 parts per million by weight.

EXAMPLE XIV

The procedure of Example XIII was repeated using identical materials, apparatus and process steps except that the reactor was vented in the final stage of the 4 hour 90° C. heating profile step, i.e. at about 235 minutes from the time that the reactor temperature first reached 90° C. The vent valve was then closed and pressure raised to 15 psi by introducing nitrogen. The reaction was again vented. This pressurization and release procedure was repeated two more times in the shortest period of time possible. The reactor pressure was then raised to 60 psi and the reaction allowed to proceed according to the profile described in Example XIII. During the high temperature period the pressure reached about 80 psi and remained constant until the cooling cycle was initiated. The resulting suspension of copolymer particles was found to be stable and the copolymer particles had a number average molecular weight of 22,000, a weight molecular weight of 140,000, a molecular weight distribution of 6.3 and a yield of about 97 percent. The residual butadiene in the resulting suspension of copolymer particles was only about 17 parts per million by weight.

EXAMPLE XV

A stainless steel Pressure Reactor having a volume of 100 gallons was charged with about 154 kg of de-ionized water, about 5.43 kg of tricalcium phosphate, about 87 grams of an organosodium naphthalene sulfonate (Alkanol XC), about 3.5 kg of benzoyl peroxide, about 405 grams of TBEC, about 110 kg of styrene monomer and about 16 kg of 1,3-butadiene monomer. The reactor was equipped with a thermocouple and a four bladed turbine stirrer. The reactor head contained a pressure gage, and inlets and outlets for gas and reactants. A condenser was employed to prevent loss of water during an initial flushing of the reactor with nitrogen to remove oxygen prior to the addition of the monomers. Heating and cooling was effected by means of a jacket. The temperature of the reactor was raised from room temperature to about 90° C. over a period of about 45 minutes and thereafter maintained at 90° C. for about 4 hours. The temperature of the reactor was then raised to about 125° C. over a period of about 40 minutes and thereafter maintained at 125° C. for another hour. The reactor was allowed to cool to room temperature for about 25 minutes. The resulting suspension of copolymer particles was found to be stable and the copolymer particles had a number average molecular weight of 21000, a weight average molecular weight of 121,000, a molecular weight distribution of 5.7 and a yield of about 97 percent. The residual butadiene in the resulting suspension of copolymer particles was about 19.4 parts per million by weight.

EXAMPLE XVI

The procedure of Example XV was repeated using identical materials, apparatus and process steps except that the reactor was vented in the final stage of the 4 hour 90° C. heating profile step, i.e. at about 235 minutes. The vent valve was then closed and pressure raised to 15 psi by introducing nitrogen. The reaction was again vented. This pressurization and release procedure was repeated two more times in the shortest period of time possible. The reactor pressure was then raised to 60 psi and the reaction allowed to proceed according to the profile described in Example XV. During the high temperature period the pressure reached about 80 psi and remained constant until the cooling cycle was initiated. The resulting suspension of copolymer particles was found to be stable and the copolymer particles had a number average molecular weight of 21,000, a weight molecular weight of 142,000, a molecular weight distribution of 6.4 and a yield of about 99 percent. The residual butadiene in the resulting suspension of copolymer particles was only about 0.4 part per million by weight.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for forming a copolymer of styrene and butadiene comprising providing an aqueous phase comprising an aqueous mixture comprising water, styrene monomer, butadiene monomer, a suspension stabilizing agent, and a chain propogating amount of a free radical polymerization initiator insoluble in water, soluble in said styrene monomer, soluble in said butadiene monomer and having a 1 hour half-life between about 50° C. and about 130° C., the ratio of said styrene monomer and said butadiene monomer being between about 80:20 and about 95:5 by weight, the weight proportion of water to the combination of said styrene monomer and said butadiene monomer is between about 08:1 and about 2:1, said suspension stabilizing agent consisting essentially of a finely-divided, difficultly water-soluble powder and a vapour phase comprising an inert gas and butadiene monomer, heating said aqueous phase and said vapor phase to a temperature between about 50° C. and about 130° C. at a pressure between about 20 psi and about 140 psi in the absence of redox initiators and mercaptan compounds, removing butadiene monomer from said vapour phase after at least about 75 percent by weight of said butadiene monomer and said styrene monomer in said aqueous phase are converted to a copolymer and prior to conversion of more than about 98 percent by weight of said butadiene monomer and said styrene monomer to a copolymer in said aqueous phase, and heating said aqueous phase at a temperature between about 50° C. and about 130° C. at a pressure between about 20 psi and about 140 psi until at least about 90 percent by weight of said sytrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer between about 2 and about 9 and a butadiene monomer concentration of less than about 10 parts per million by weight.

2. A process according to claim 1 including heating said aqueous mixture to a temperature less than about 100° C.

3. A process according to claim 1 including heating said aqueous mixture for less than about 8 hours.

4. A process according to claim 1 wherein said aqueous mixture comprises from about 0.05 percent to about 6.5 percent by weight of said free radical polymerization initiator based on the total weight of said styrene monomer and said butadiene monomer, said initiator having a one hour half-life at a temperature between about 50° C. and about 100° C.

5. A process according to claim 1 wherein said aqueous mixture comprises from about 0.5 percent to about 6.0 percent by weight of said suspension stabilizing agent based on the total weight of said styrene monomer and said butadiene monomer.

6. A process according to claim 1 including agitating said aqueous mixture while heating.

7. A process according to claim 1 including removing sufficient butadiene monomer from said vapour phase to reduce the butadiene monomer in said vapour phase to less than about 0.05 percent by volume.

8. A process according to claim 1 including removing said butadiene monomer from said vapour phase by venting, raising the pressure and venting, said raising the pressure and venting being repeated at least once.

9. A process according to claim 1 including heating said aqueous mixture in accordance with a predetermined heating profile comprising heating said aqueous mixture to a first temperature between about 50° C. and less than about 100° C., maintaining said first temperature in accordance with said predetermined heating profile, heating said aqueous mixture to a second temperature at least about 15° C. greater than said first temperature and greater than about 90° C. and less than about 130° C. in accordance with said predetermined heating profile and maintaining said second temperature in accordance with said predetermined heating profile.

10. A process according to claim 9 including introducing in said aqueous mixture prior to said heating at least two free radical polymerization initiators of which at least one becomes practically active only in the second temperature stage which is greater than about 90° C.

11. A process according to claim 9 including polymerizing between about 70 percent and about 95 percent of the total weight of said styrene monomer and said butadiene monomer at said first temperature prior to heating said aqueous mixture to said second temperature.

12. A process according to claim 9 including introducing additional styrene monomer, butadiene monomer and suspension stabilizing agent to said aqueous mixture at least one after heating to said first temperature, the proportions of said additional styrene monomer and butadiene monomer being between about 80:20 and about 95:5 by weight and polymerizing said additional styrene monomer and butadiene monomer at said second temperature until at least about 90 percent of said additional styrene monomer and butadiene monomer copolymerize.

13. A process according to claim 9 including introducing in said aqueous mixture after heating to said first temperature between about 0.05 and about 6.5 percent by weight based on the total weight of said monomers of at least one free radical polymerization initiator which becomes practically active only at said second temperature to extend the molecular weight distribution of the copolymer.

14. A process according to claim 1 including introducing additional styrene monomer, butadiene monomer, free radical polymerization initiator and suspension stabilizing agent to said aqueous mixture at least once after heating to said temperature, the proportions of said additional styrene monomer and butadiene monomer being between about 80:20 and about 95:5 by weight, and said additional free radical polymerization initiator being between about 0.05 and about 6.5 percent by weight based on the total weight of said monomers to extend the molecular weight distribution of said copolymer.

15. A process according to claim 14 including introducing said additional styrene monomer, butadiene monomer and suspension stabilizing agent to said aqueous suspension midway between initiation and termination of said heating step.

16. A process according to claim 14 wherein said suspension stabilizing agent is introduced immediately prior to or simultaneously with said additional styrene monomer and butadiene monomer.

17. A process according to claim 14 wherein said molecular weight distribution of said copolymer is between about 2 and about 8.

18. A process according to claim 14 wherein said additional styrene monomer and butadiene monomer comprise between about 60 percent and about 30 percent by weight of the total weight of the monomers introduced into said aqueous mixture.

19. A process for forming a copolymer of styrene and butadiene comprising providing an aqueous phase comprising an aqueous mixture comprising water, styrene monomer, butadiene monomer, a suspension stabilizing agent, and a chain propogating amount of a free radical polymerization initiator insoluble in water, soluble in said styrene monomer, soluble in said butadiene monomer and having a 1 hour half-life between about 50° C. and about 130° C., the ratio of said styrene monomer and said butadiene monomer being between about 80:20 and about 95:5 by weight, the weight proportion of water to the combination of said styrene monomer and said butadiene monomer is between about 0.8:1 and about 2:1, said suspension stabilizing agent consisting essentially of a finely-divided, difficultly water-soluble powder and a vapour phase comprising an inert gas and butadiene monomer, heating said aqueous phase and said vapour phase in accordance with a predetermined heating profile comprising heating said aqueous mixture to a first temperature between about 50° C. and less than about 100° C. at a pressure between about 20 psi and about 140 psi, maintaining said first temperature in accordance with said predetermined heating profile, removing butadiene monomer from said vapour phase after at least about 75 percent by weight of said butadiene monomer and said styrene monomer in said aqueous phase are converted to a copolymer and prior to conversion of more than about 98 percent by weight of said butadiene monomer and said styrene monomer to a copolymer in said aqueous phase, heating said aqueous mixture to a second temperature at least about 15° C. greater than said first temperature and greater than about 90° C. and less than about 130° C. in accordance with said predetermined heating profile, and maintaining said second temperature in accordance with said predetermined heating profile at a pressure between about 20 psi and about 140 psi until at least about 90 percent by weight of said styrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer between about 2 and about 9 and a butadiene monomer concentration of less than about 10 parts per million by weight.

20. A process according to claim 19 including introducing in said aqueous mixture prior to said heating at least two free radical polymerization initiators of which at least one becomes partially active only in the second temperature stage which is greater than about 90° C.

21. A process for forming a copolymer of styrene and butadiene comprising providing an aqueous phase comprising an aqueous mixture comprising water, styrene monomer, butadiene monomer, a suspension stabilizing agent, and a chain propogating amount of a free radical polymerization initiator insoluble in water, soluble in said styrene monomer, soluble in said butadiene monomer and having a 1 hour half-life between about 50° C. and about 130° C., the ratio of said styrene monomer and said butadiene monomer being between about 80:20 and about 95:5 by weight, the weight proportion of water to the combination of said styrene monomer and said butadiene monomer is between about 08:1 and about 2:1, said suspension stabilizing agent consisting essentially of a finely-divided, difficultly water-soluble powder and a vapour phase comprising an inert gas and butadiene monomer, heating said aqueous phase and said vapour phase to a temperature between about 50° C. and about 130° C. at a pressure between about 20 psi and about 140 psi in the absence of redox initiators and mercaptan compounds, introducing additional styrene monomer, butadiene monomer, free radical polymerization initiator and suspension stabilizing agent to said aqueous mixture at least once after heating to said temperature, the proportions of said additional styrene monomer and butadiene monomer being between about 80:20 and about 95:5 by weight, and said additional free radical polymerization initiator being between about 0.05 and about 6.5 percent by weight based on the total weight of said monomers to extend the molecular weight distribution of said copolymer, heating said aqueous phase and said vapour phase to a temperature between about 50° C. and about 130° C. at a pressure between about 20 psi and about 140 psi in the absence of redox initiators and mercaptan compounds until said styrene monomer and said butadiene monomer form an aqueous suspension of discrete copolymer particles, removing butadiene monomer from said vapour phase after at least about 75 percent by weight of said butadiene monomer and said styrene monomer in said aqueous phase are converted to a copolymer and prior to conversion of more than about 98 percent by weight of said butadiene monomer and said styrene monomer to a copolymer in said aqueous phase, and heating said aqueous phase at a temperature between about 50° C. and about 130° C. at a pressure between about 20 psi and about 140 psi until at least about 90 percent by weight of said styrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer between about 2 and about 9 and a butadiene monomer concentration of less than about 10 parts per million by weight.

22. A process according to claim 21 including introducing in said aqueous mixture prior to said heating at least two free radical polymerization initiators of which at least one becomes spractically active only in the second temperature stage which is greater than about 90° C.

* * * * *